United States Patent

[11] 3,558,899

[72] Inventors Mark Morgan;
Hans R. Rottmann, Poughkeepsie, N.Y.
[21] Appl. No. 759,257
[22] Filed Aug. 30, 1968
[45] Patented Jan. 26, 1971
[73] Assignee International Business Machines Corporation
Armonk, N.Y.
a corporation of New York

[54] SYSTEM AND METHOD FOR USING NUMERICALLY CODED ETCHED INDICIA FOR IDENTIFICATION OF PIECES OF SEMICONDUCTOR MATERIAL
2 Claims, 4 Drawing Figs.

[52] U.S. Cl. .......... 250/219, 235/61.11, 250/223
[51] Int. Cl. .......... G01n 21/30, G06k 7/00, G06m 7/00
[50] Field of Search .......... 250/219Id, 219Idd, 223, 219Idc; 235/61.11

[56] References Cited
UNITED STATES PATENTS

| | | | |
|---|---|---|---|
| 2,612,994 | 10/1952 | Woodland et al. | 250/223X |
| 3,365,699 | 1/1968 | Foster | 250/223X |
| 3,469,103 | 9/1969 | Erpel | 250/219 |

*Primary Examiner*—James W. Lawrence
*Assistant Examiner*—T. N. Grigsby
*Attorney*—Sughrue, Rothwell, Mion, Zinn & MacPeak

ABSTRACT: Coded indicia are placed on the surface of a piece of semiconductor material by etching discrete areas on the material. These indicia represent a numerical code which is physically represented by the etching or nonetching of predetermined ones of said discrete areas. The attenuation or enhancement of radiant flux transmitted or reflected by an etched area differs from that of the radiant flux transmitted or reflected by a nonetched area. Radiant energy is directed onto these indicia, and the transmitted or reflected radiant flux from the areas containing these indicia is measured to determine the change (i.e., attenuation or enhancement) of the radiant flux and to provide a numerical output indication corresponding to the indicia.

INVENTORS
MARK MORGAN
HANS R. ROTTMANN

BY Sughrue, Rothwell, Mion, Zinn & Macpeak
ATTORNEYS

INVENTORS
MARK MORGAN
HANS R. ROTTMANN

BY Sughrue, Rothwell, Mion, Zinn & Macpeak
ATTORNEYS

INVENTORS
MARK MORGAN
HANS R. ROTTMANN

BY Sughrue, Rothwell, Mion, Zinn & Macpeak
ATTORNEYS

SYSTEM AND METHOD FOR USING NUMERICALLY CODED ETCHED INDICIA FOR IDENTIFICATION OF PIECES OF SEMICONDUCTOR MATERIAL

BACKGROUND OF THE INVENTION

1. Field of the Invention

This invention relates to the processing of semiconductor wafers, and more particularly, to the automatic identification of the wafers during the manufacturing process.

2. Description of the Prior Art

Conventional letters and numerals have previously been etched into semiconductor wafers so that a technician could look at the wafer and tell its type without detailed wafer pattern analysis. However, such etching of conventional letters and numerals cannot provide coded indicia which are easily read by a machine.

SUMMARY OF THE INVENTION

As integrated circuits come into more common use, their manufacture in large numbers and multiple types becomes more common. In a fully automated system for manufacture of the integrated circuits, it becomes necessary to identify automatically the types of semiconductor wafers in the manufacturing process. It is desirable that this automatic identification be done while the wafers are in transport from one processing stage to the next.

Accordingly, the invention may be summarized as a method and system for etching coded indicia onto a semiconductor wafer, and for automatically reading and decoding such indicia to identify the wafer during the manufacturing process.

DESCRIPTION OF THE PREFERRED EMBODIMENTS

Figure 1:
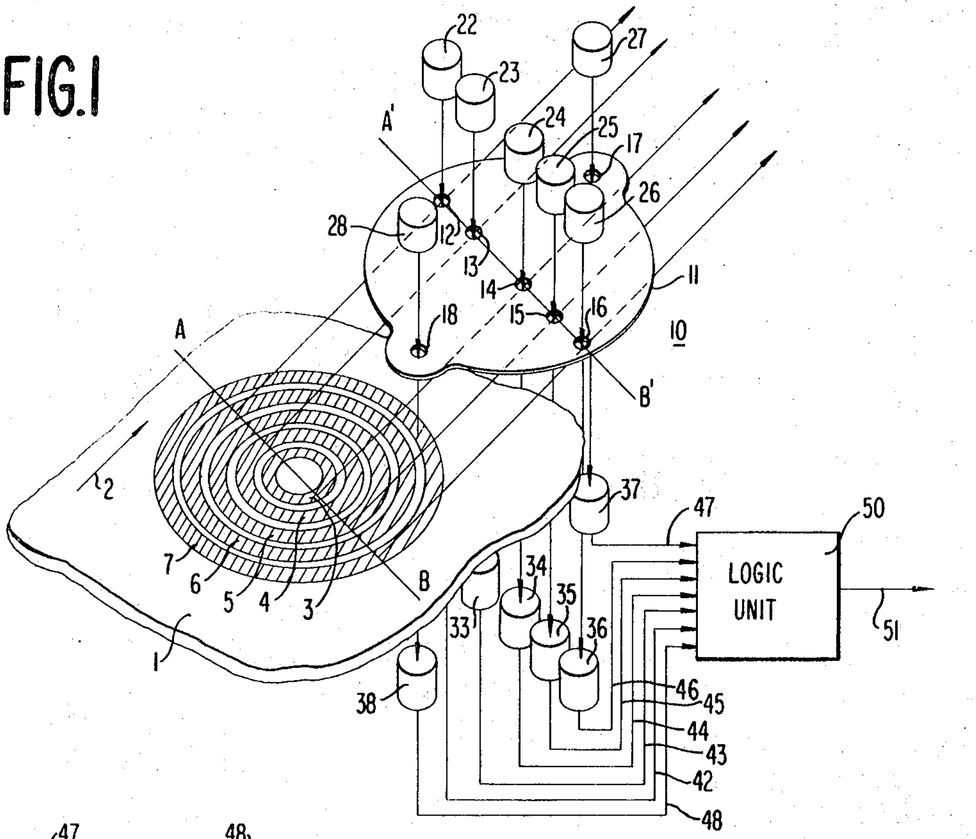
FIG. 1 illustrates a system according to the present invention for simultaneously reading coded indicia from a number of etched areas.

FIG. 1 is a diagram of one embodiment of the system. A wafer of semiconductor material, a section 1 of which is illustrated, is moving through an identification station in a direction indicated by arrow 2. A plurality of discrete areas 3—7, indicated as a plurality of concentric bands on the surface of wafer 1, are positioned to be moved directly under the reading station. Each of the concentric bands 3—7 may be previously etched or nonetched to correspond with the desired numerical indication. The etching is done in a manner well known in the semiconductor manufacturing art, and is done during the early manufacturing stages of the specific device to be constructed on the wafer.

Although the following description is in terms of light, light sources, and photosensors, the invention broadly includes all forms of radiant energy, including light. The description of the preferred embodiment as using light should not be taken to preclude the other usable forms of radiant energy.

A reading station 10 contains the necessary optical elements to direct light through the wafer 1 to read the coded indicia. A mask 11 contains a plurality of openings 12 through 16 situated over an imaginary line A′—B′. Another imaginary line A—B runs diametrically through the concentric bands 3—7 perpendicular to the direction of movement 2. When the wafer 1 has moved under reading station 10 such that line A′—B′ s directly over line A—B, the wafer is in the proper position for reading the indicia contained thereon.

Opening 16 is directly over a section of band 7, opening 15 over band 5, opening 14 over band 3, opening 13 over band 4, and opening 12 over band 6. As long as the bands are centered under the reading station, the angular orientation of the wafer does not affect the readability of the coded indicia. If the wafer is rotated in any amount about the center of the concentric bands, some section of the appropriate band will still remain under the corresponding opening in mask 11.

Light sources 22—26 generate light in a waveband transmittable through the semiconductor material. Preferably, this light is in the infrared waveband. Light sources 22—26 respectively direct light through opening 12—16 to photosensors located below the wafer. Photosensors 33—36 are illustrated and are respectively associated with light sources 23—26. The remaining photosensor, hidden behind the wafer, is not illustrated. Electrical outputs, corresponding respectively to light received from light sources 22—26, are carried on lines 42—46 to logic unit 50.

When the wafer is in position under the identification station, the light transmitted through the wafer to the photosensitive devices will vary in intensity, according to whether or not the section of the wafer immediately under each opening is etched or not. The signals on lines 42—46 are binary indications of whether or not the wafer areas are etched. Logic unit 50 may contain threshold devices to distinguish the signal from ambient noise.

Light sources 27 and 28, openings 17 and 18, photosensors 37 and 38, and lines 47 and 48 form an edge sensing system for triggering operation of the logic unit when the relative displacement between the indicia areas and the reading station is small. When band 7 has been advanced to position under both openings 17 and 18, photosensors 37 and 38 supply an indication of this position via lines 47 and 48 to logic unit 50. The logic unit operates to identify the signals during the interval when band 7 is under both openings 17 and 18. Before band 7 is under opening 17, the wafer has not advanced enough for reading. After band 7 has passed opening 18, the wafer has advanced too far for reading. Thus, the reading must be done when band 7 is under both openings 17 and 18.

Figure 2:
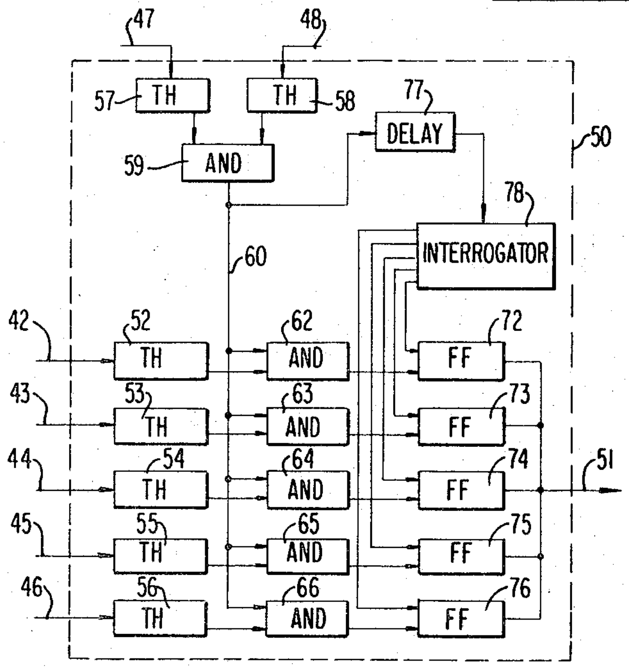
FIG. 2 is a block diagram of a logic unit usable in FIG. 1.

FIG. 2 is a block diagram of a logic unit usable in FIG. 1. This specifically described logic unit forms no part of the present invention and any other logic unit having similar function could be used as the logic unit of FIG. 1. The signals on lines 42—48 enter the logic unit and are applied respectively to threshold devices 52—58. The outputs from threshold devices 57 and 58 are applied to AND gate 59 to derive an output signal on a line 60 when the edge of band 7 is under both openings 17 and 18 of FIG. 1. The signal on line 60 is applied to one input of each of AND gates 62—66. The output signals from threshold devices 52—56 are respectively applied to the other input terminal of AND gates 62—66. The binary output from AND gates 62—66 are respectively applied to flip-flop storage elements 72—76. A delay element 77 receives the signal from line 60 and triggers the operation of an interrogator 78. Interrogator 78 successively interrogates each of flip-flops 72—76 to derive output signals which are applied to line 51 to derive a train of output signals.

Figure 3:
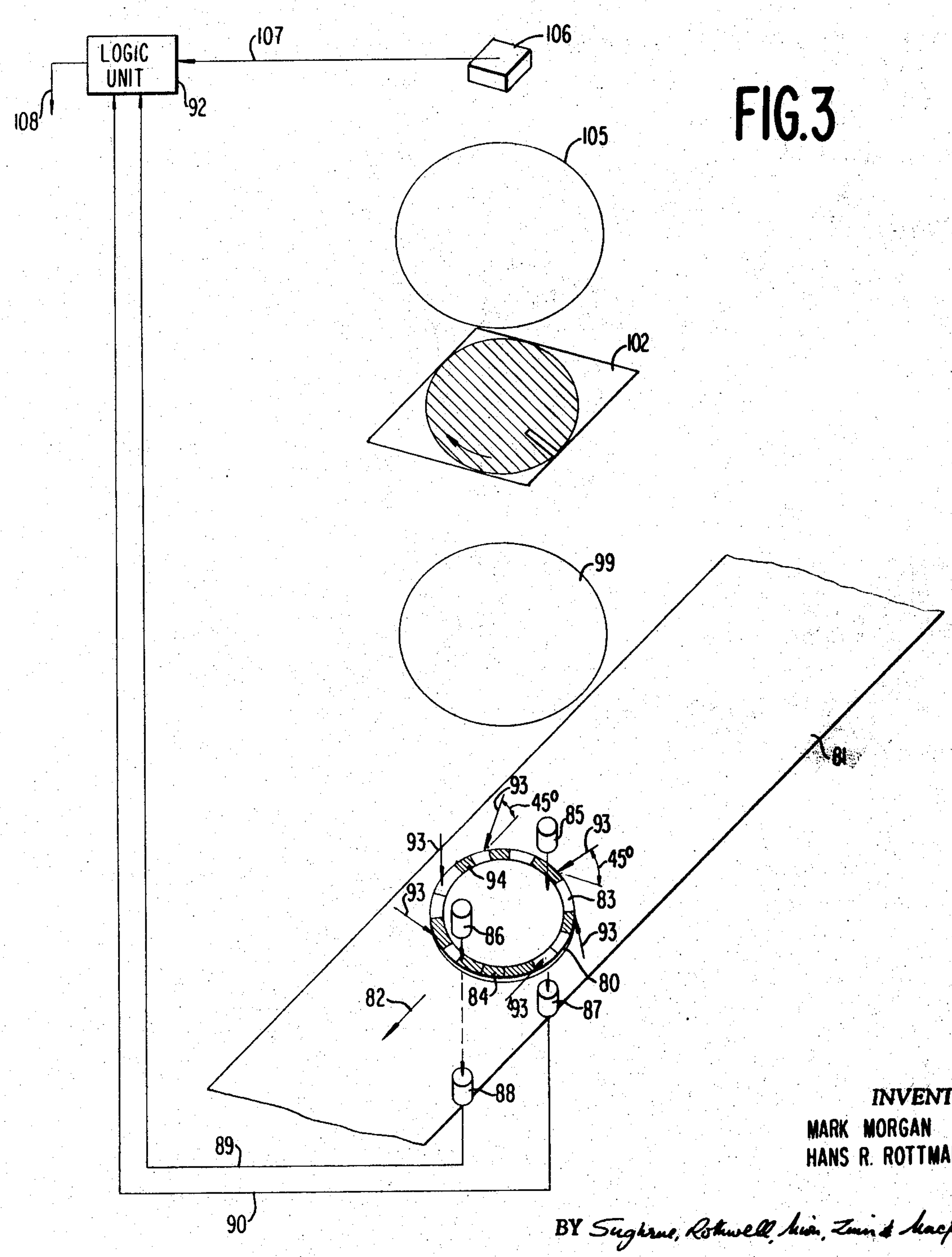
FIGS. 3 and 4 illustrate another embodiment of the present invention for scanning the coded areas to sequentially read the coded indicia.

FIG. 3 illustrates another embodiment of the present invention for scanning the coded areas to sequentially read the coded indicia. A wafer of semiconductor material 80 is moved along a processing path 81 in the direction of arrow 82. The movement of the semiconductor wafer may be accomplished by the use of air currents, or other suitable movement means. The semiconductor wafer 80 contains a peripheral band 83 containing a number of etched areas 84, corresponding to coded indicia. The etched areas 84 are placed on the peripheral band 83 to correspond to a numerical code identifying the piece of semiconductor material.

Light sources 85 and 86 and photosensors 87 and 88 operate as edge sensors, as previously described in connection with FIG. 1. Output signals are produced on lines 89 and 90 to indicate that the device is in position for reading of the coded indicia. The signals on lines 89 and 90 are applied to a logic unit 92.

The coded indicia are illuminated by light beams 93, which are directed at the surface of the semiconductor wafer from an angle of approximately 45°. The axes of the beams form an envelope around the periphery of the wafer. Although this light simultaneously illuminates all of the coded areas, the optical system which follows serves to produce an output signal corresponding to the light reflected from only one of the discrete coded areas at a time. The incident light 93 strikes all of the areas of band 83, for example discrete area 94.

Figure 4:
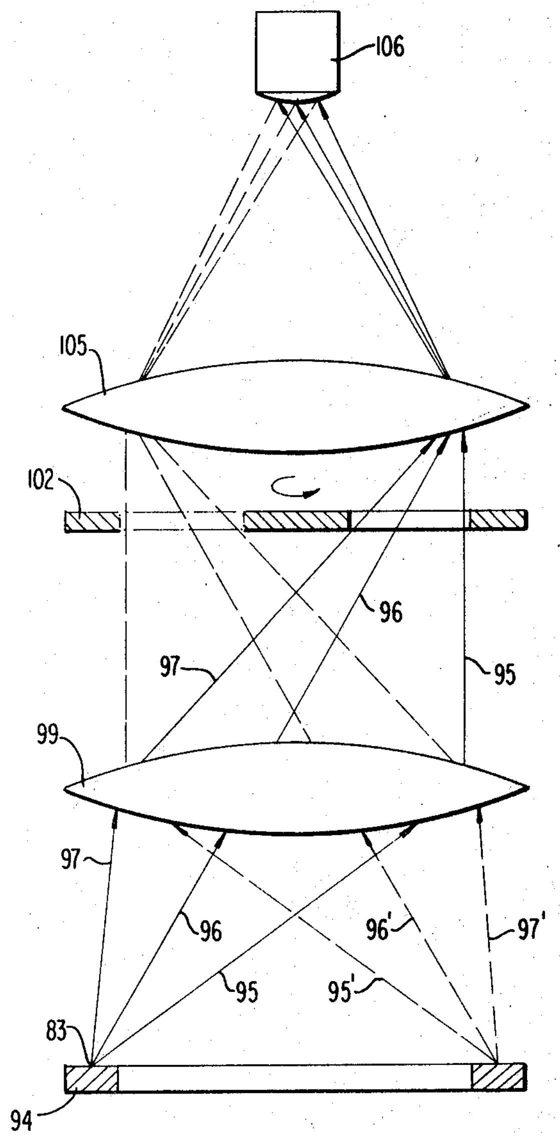

Rays of light, for example, rays 95, 96 and 97, as illustrated in FIG. 4, are reflected from each discrete area, for example area 94, and are focused by a lens 99 onto a mask 102. Mask 102, having a slit opening, is located in the image plane of lens 99. Mask 102 is designed to have its slit opening rotated about some center point to thus scan light from band 83. Light from only one area of band 83 will pass through slit mask 102 at any given instant. For example, as illustrated, only light from a region on discrete area 94 will pass through the slit.

The light passing through the slit traverses a second lens 105 located immediately behind mask 102. Lens 105 projects an image of lens 99 onto photosensitive element 106, which generates an output signal on line 107. The image of lens 99 on photosensitive element 106 remains stationary despite the rotary scanning motion of mask 102. Line 107 applies this output signal to logic unit 92 to generate an output signal on line 108.

FIG. 4 also illustrates the path of light rays 95', 96' and 97' by broken lines when mask 102 is rotated to have its slit in another position shown by broken lines. The light rays again strike photosensitive element 106.

The indicia on band 83 are decoded by means of the rotating slit of mask 102 and photosensitive element 106. These indicia appear as output signals on line 107. Thus the etched or nonetched segments 84 are translated into a train of electrical signals on line 107.

The presence and absence of these signals constitute the code identifying the wafer. In common practice, an electronic clock can be used which can be in logic unit 92. The clock is started by special indicia on band 83, the orientation of which is irrelevant The clock is synchronized for scanning the signals; this is not part of the present invention.

In its simplest form, logic unit 92 may be a three input AND gate. The choice of logic unit 92 depends upon the type of signals on lines 89 and 90, as developed by the photosensors. However, the basic consideration in this choice is that the signal on line 107 be passed by the logic unit only when the outputs from the edge detector system indicate that the wafer is in position for proper reading.

While the invention has been particularly shown and described with reference to preferred embodiments thereof, it will be understood by those skilled in the art that various changes in form and details may be made therein without departing from the spirit and scope of the invention.

We claim:

1. A system for identifying a piece of semiconductor material, comprising:

a. a plurality of discrete areas on said piece, some of said areas being etched and some of said areas being nonetched to correspond to a numerical code;

b. means for irradiating each of said areas to yield radiation in respectively different amounts from said etched areas and said nonetched areas;

c. output means for receiving said yielded radiation and for generating electrical signals corresponding to said numerical code in response to said radiation; and d. wherein all of said discrete areas are located in a single circular band located near the periphery of the surface of said piece.

2. A system according to claim 1 wherein each of the etched ones of said discrete areas is bounded by lines extending radially across said circular band.